United States Patent
Cheng et al.

(10) Patent No.: US 6,548,571 B1
(45) Date of Patent: Apr. 15, 2003

(54) INK COMPOSITIONS AND PROCESSES

(75) Inventors: Chieh-Min Cheng, Rochester, NY (US); Min-Hong Fu, Webster, NY (US)

(73) Assignee: Xerox Corporation, Stamford, CT (US)

( * ) Notice: Subject to any disclaimer, the term of this patent is extended or adjusted under 35 U.S.C. 154(b) by 32 days.

(21) Appl. No.: 09/385,909

(22) Filed: Aug. 30, 1999

(51) Int. Cl.⁷ .................. C09D 11/10; C08L 81/00; C08F 228/00
(52) U.S. Cl. .................. 523/160; 524/609; 526/287
(58) Field of Search .................. 523/160, 161; 524/609, 548, 556; 526/287; 348.5, 348.6, 348.1; 106/31.6, 31.28, 31.59, 31.89

(56) References Cited

U.S. PATENT DOCUMENTS

| | | | | |
|---|---|---|---|---|
| 4,387,174 A | * | 6/1983 | Lundberg et al. | 524/66 |
| 4,463,359 A | | 7/1984 | Ayata et al. | 346/1.1 |
| 4,623,689 A | * | 11/1986 | Shintani et al. | 524/457 |
| 4,840,674 A | | 6/1989 | Schwarz | 106/22 |
| 4,853,036 A | | 8/1989 | Koike et al. | 106/20 |
| 5,021,802 A | | 6/1991 | Allred | 346/1.1 |
| 5,041,161 A | | 8/1991 | Cooke et al. | 106/22 |
| 5,043,084 A | | 8/1991 | Gutierrez et al. | 252/47 |
| 5,065,167 A | | 11/1991 | You et al. | 346/1.1 |
| 5,089,578 A | * | 2/1992 | Valint et al. | 526/240 |
| 5,124,718 A | | 6/1992 | Koike et al. | 346/1.1 |
| 5,207,825 A | | 5/1993 | Schwarz, Jr. | 106/22 R |
| 5,223,026 A | | 6/1993 | Schwarz, Jr. | 106/20 D |
| 5,278,020 A | | 1/1994 | Grushkin et al. | 430/137 |
| 5,290,479 A | * | 3/1994 | Clark | 252/351 |
| 5,290,654 A | | 3/1994 | Sacripante et al. | 430/137 |
| 5,294,664 A | * | 3/1994 | Morrison, Jr. et al. | 524/560 |
| 5,308,734 A | | 5/1994 | Sacripante et al. | 430/137 |
| 5,713,993 A | * | 2/1998 | Grezzo Page et al. | 106/31.85 |
| 5,719,204 A | * | 2/1998 | Beach et al. | 523/161 |
| 5,762,695 A | | 6/1998 | Wong et al. | 106/31.89 |
| 5,814,685 A | * | 9/1998 | Satake et al. | 523/201 |
| 5,837,043 A | | 11/1998 | Wong et al. | 106/31.58 |
| 5,849,833 A | * | 12/1998 | Puschak et al. | 524/521 |
| 5,851,274 A | * | 12/1998 | Lin | 106/31.43 |
| 5,852,073 A | * | 12/1998 | Villiger et al. | 523/161 |
| 5,869,590 A | * | 2/1999 | Clark et al. | 526/323 |
| 5,891,950 A | * | 4/1999 | Collins et al. | 524/502 |
| 5,938,827 A | | 8/1999 | Breton et al. | |
| 5,969,033 A | * | 10/1999 | Pearstine | 524/502 |
| 5,977,209 A | * | 11/1999 | Breton et al. | 523/160 |
| 5,977,210 A | * | 11/1999 | Patel et al. | 523/161 |
| 5,998,501 A | * | 12/1999 | Tsutsumi et al. | 523/160 |

* cited by examiner

Primary Examiner—Callie Shosho
(74) Attorney, Agent, or Firm—Robert F. Thompson

(57) ABSTRACT

A process for the preparation of an ink which comprises mixing an ink vehicle, a colorant and a latex generated by the polymerization of a mixture of olefinic monomers, wherein at least one of said olefinic monomers is an ionic sulfonate monomer and which polymerization is accomplished in the presence of an anionic surfactant, and a nonionic surfactant.

1 Claim, No Drawings

INK COMPOSITIONS AND PROCESSES

Disclosed in U.S. Pat. No. 5,837,043 and U.S. Pat. No. 5,762,695, the disclosures of each application being totally incorporated herein by reference in their entirety, are inks with certain surfactants. More specifically, in U.S. Pat. No. 5,762,695, there is disclosed an ink jet ink and imaging process which comprises the development of an image with an aqueous ink jet ink composition comprised of, for example, colorant, water, and resin.

The following applications, the disclosures of each being totally incorporated herein by reference, relate to ink compositions and processes thereof:

- U.S. Ser. No. 09/385,908 and U.S. Ser. No. 09/885,207, being filed concurrently herewith;
- U.S. Ser. No. 523/160 U.S. Pat. No. 5,973,026 relating to an aqueous ink containing a dissipatable polymer, colorant and a zwitterionic component like betaine;
- U.S. Pat. No. 5,973,026 relating to an ink containing a colorant, polymer, such as a dissipatible polymer, vehicle, and a salt of polyacrylic, a salt of polyamic acid, a salt of alginic acid, or mixtures thereof;
- U.S. Pat. No. 5,969,003 relating to an ink containing a resin of a dissipatible sulfonated polyester terminated with acrylic or methacrylic acid groups; and
- U.S. Pat. No. 5,938,827 relating to an ink containing a mixture of two black colorants, betaine, and N,N'-bis (3-aminopropyl) ethylenediamine.

Emulsion/aggregation/coalescence processes for the preparation of dry toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256 and 5,501,935.

The appropriate components and processes of the above applications and patents may be selected for the present invention in embodiments thereof.

BACKGROUND OF THE INVENTION

The present invention is generally directed to ink compositions, and processes thereof, and more specifically, the present invention is directed to processes for the preparation of colored aqueous ink compositions, that is inks preferably containing a vehicle like water particularly suitable for use in ink jet printing processes, and especially thermal ink jet processes, and other similar processes, and wherein there is permitted minimal or no kogation, inks with suitable particle sizes, minimal intercolor bleed for the images developed, substantially stable latexes, and wherein paper curl is minimized and image smearing is minimal, or avoided. The inks in embodiments of the present invention are comprised of an ink vehicle, colorant, and additives, and wherein the inks can be prepared by blending and optionally heating an ionic sulfonate polymer latex and preferably a copolymer of unsaturated ionic sulfonate monomer or monomers and ethylenically unsaturated monomers, wherein the ethylenically unsaturated monomers are ethylenically unsaturated esters, styrene functional monomers or olefinic acids, and a colorant dispersion, and wherein the latex can be prepared by emulsion polymerization with at least two surfactants of, for example, an anionic surfactant and a nonionic surfactant, and wherein the inks exhibit substantially no kogation or heater deposits. Prevention of heater deposits/kogation enables for example, superior ink jetting performance and enhanced life in the printhead. The ionic sulfonate resin incorporated in the ink also enables, for example, excellent ink thermal stability, then the shelf life of the ink is prolonged, for example the ink does not decompose or settle for extended time periods of up to about one year.

PRIOR ART

Ink jet printing can be considered a non-impact method that produces droplets of ink that are deposited on a substrate, such as paper or transparent film, in response to an electronic digital signal. Thermal or bubble jet drop-on-demand ink jet printers are useful as outputs for personal computers in the office and in the home.

In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink remaining in the channel between the nozzle and bubble starts to move toward the collapsing bubble causing a volumetric contraction of the ink at the nozzle and resulting in the separation from the nozzle of the bulging ink as a droplet. The feed of additional ink provides the momentum and velocity for propelling the droplet towards a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

Ink jet inks, and processes hereof are illustrated, for example, in U.S. Pat. Nos. 4,840,674; 5,021,802; 5,041,161; 4,853,036; 5,124,718; 5,065,167 and 5,043,084, the disclosures of which are totally incorporated herein by reference.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some systems, a relatively small printhead moves across a print sheet numerous times in swathes, much like a typewriter. Alternatively, a printhead, which consists of an array of ejectors and extends the full width of the print sheet, may be passed once down the print sheet to give full-page images in what is known as a "full-width array" (FWA) printer. When the printhead and the print sheet are moved relative to each other, imagewise digital data is used to selectively activate the thermal energy generators in the printhead to permit the desired image to be created on the print sheet.

With the demand for higher resolution printers, the nozzles in ink jet printers, are decreasing in size. Nozzle openings are typically about 50 to 80 micrometers in width or diameter for 300 spi printers. With the advent of 600 spi printers, these nozzle openings are typically about 10 to about 40 micrometers in width or diameter These small dimensions require inks that do not plug the small openings.

Therefore, an important requirement for ink jet ink is the ability of the ink to be stable with minimal or no settling, the ability of the ink to remain in a fluid condition in a printhead opening on exposure to air, and moreover wherein when the inks are selected for ink jet printing there is minimized paper curl, or wherein paper curl can be controlled.

Another important measured property for an ink jet ink is the latency or decap time, which is the length of time over which an ink remains fluid in a printhead opening or nozzle when exposed to air and, therefore, is capable of firing a drop of ink at its intended target. Latency is the maximum idling times allowed for ink to be jetted by a printer with a speed equal to or greater than 5 m/s (equivalent to an ink traveling a distance of 0.5 millimeters in less than 100 µs) without a failure. This measurement can be accomplished with the printhead or nozzles uncovered or decapped and generally at a relative humidity of about 15 percent. The time interval, for example, is the longest length of time that the printhead, uncovered, will still fire or eject a specified drop without drop displacement or loss of density. The longer the latency time rating, the more desirable the ink. The inks of the present invention possess many of these characteristics in embodiments thereof.

Moreover, an important requirement for ink jet inks, especially for pigment, such as carbon black, based inks, is for the pigment dispersion to remain stable throughout the life of the ink jet cartridge. Dye-based ink jet inks suffer from deficiencies in shelf life, waterfastness and lightfastness after being printed on various substrates. Pigments provide an image on a wide variety of substrates, having high optical density with high waterfastness and lightfastness. Therefore, pigments are a preferred alternative to dyes, provided the pigment dispersions can be rendered stable to prevent flocculation and/or aggregation and settling. Some cosolvents that can be selected as clogging inhibitors cause destabilization of pigment dispersions and, therefore, are not usually effective in pigmented inks.

There is thus a need for aqueous ink compositions and processes thereof that can be utilized in high resolution ink jet printers. Additionally, there is a need for colored, especially pigmented inks that provide high latency and also remain stable throughout the life of the ink jet cartridge. There is also a need for colored inks that provide high optical density in a single pass. More importantly, there is a need for ink jet inks wherein paper curl, and/or image smearing can be eliminated or minimized when such inks are selected for ink jet printing processes, and wherein the images possess minimal, or acceptable intercolor bleed, that is for example, wherein color overlap, or diffusing of one color into another is minimal, or avoided; and wherein excellent waterfast and lightfast images can be generated. These and other needs and advantages can be achievable with the present invention in embodiments thereof.

SUMMARY OF THE INVENTION

Aspects of the present invention relate to a process for the preparation of an ink which comprises mixing an ink vehicle, a colorant and a latex generated by the polymerization of a mixture of olefinic monomers, wherein at least one of the olefinic monomers is an ionic sulfonate monomer and which polymerization is accomplished in the presence of an anionic surfactant, and a nonionic surfactant; a process wherein the latex is generated from a mixture of from about 2 to about 10 monomers; a process wherein the latex is generated from a mixture of from about 2 to about 4 monomers; a process wherein the olefinic monomer is a styrene acrylate, a styrene methacrylate, a methacrylate, or an acrylate; a process wherein the olefinic monomers are comprised of an ionic sulfonate monomer, an alkyl acrylate, and an alkyl methacrylate; a process wherein the oletinic monomers are comprised of (1) an ionic sulfonate monomer, and (2) an alkyl acrylate, an alkyl methacrylate, a benzyl methacrylate, an acrylonitrile, a styrene functional monomer, or an acid olefinic monomer; a process wherein subsequent to polymerization there results a terpolymer, or a copolymer; a process wherein the ionic sulfonate monomer is of the formula

wherein R is hydrogen or alkyl, R' is alkylene, or —CO—$R_2$ wherein $R_2$ is amino substituted with alkyl or hydrogen, $(CH_2)_n$—O, wherein n represents a number of from about 0 to about 5; X is hydrogen, or a monovalent cation and m represents the number of segments of R', and wherein the ionic sulfonate monomer is optionally selected in an amount of from about 0.5 to about 15 weight percent based on the amount of monomers selected to generate the latex polymer; a process wherein m is zero, or 1; a process wherein alkylene contains from 2 to about 18 carbon atoms; a process where alkylene is ethylene, propylene, or butylene; a process wherein amino substituted with alkyl is acrylamido, methacrylamido, or acrotonylamido; a process wherein the monovalent cation X is ammonium, sodium, or potassium and the $(CH_2)_n$—O is methoxy, ethoxy, or butoxy; a process wherein the monovalent cation X is an alkali metal and the $(CH_2)_n$—O is alkoxy; a process wherein the ionic sulfonate monomer is ammonium 2-acrylamido-2-methylpropane sulfonate, sodium 2-acrylamido-2-methylpropane sulfonate, or 2-acrylamido-2-methylbutane sulfonic acid; a process wherein the ionic sulfonate monomer is sodium vinyl sulfonate, or potassium vinyl sulfonate; a process wherein the ionic sulfonate monomer is comprised of the salts thereof of 2-acrylamido-2-methylpropanesulfonic acid ammonium salt, 2-acrylamido-2-methylpropane sulfonic acid sodium salt, or 2-acrylamido-2-methylbutanesulfonic acid potassium salt; a process wherein a mixture of two monomers is selected; a process wherein the anionic surfactant is sodium dodecyl sulfate, sodium dodecylbenzene sulfonate, sodium dodecyl naphthalene sulfate, sodium dodecyl diphenyloxide disulfonate, or sodium N-decyl diphenyloxide disulfonate, and the nonionic surfactant is polyvinyl alcohol, polyacrylic acid, methyl cellulose, polyoxyethylene octylphenyl ether, or polyoxyethylene nonylphenyl ether; wherein the anionic surfactant is selected in an amount of from about 0.1 to about 10 weight percent based on the total weight percent amount of monomers, anionic surfactant, and nonionic surfactant; wherein the nonionic surfactant is selected in an amount of from about 0.1 to about 6 weight percent based on the total weight percent amount of monomers, anionic surfactant, and nonionic surfactant; a process wherein the anionic surfactant is sodium dodecyl sulfate, sodium dodecylbenzene sulfonate, sodium dodecyl naphthalene sulfate, sodium dodecyl diphenyloxide disulfonate, or sodium N-decyl diphenyloxide disulfonate; a process wherein the nonionic surfactant is selected in an amount of from about 0.1 to about 6 weight percent based on the total weight percent amount of monomer, anionic surfactant, and nonionic surfactant; a process wherein the ink vehicle is present in an amount of from about 50 to about 99 percent by weight, the colorant is present in an amount of from about 1 to about 20 percent by weight, and the ionic sulfonate latex polymer generated after polymerization is present in an amount of from about 0.05 to about 20 percent by weight, and which ink further includes a biocide present in an amount of from about 0.1 to about 10 percent by weight, a humectant present in an amount of from about 0.1 to about 50 percent by weight, a polymeric additive present in an amount of from about 0.1 to about 10 percent by weight, and a stabilizer additive present in an amount of from about 0.1 to about 5 percent by weight, based on the total amount of components in the ink and which total is about 100 percent; a process wherein the colorant is a dye; a process wherein the colorant is a pigment; a process wherein subsequent to polymerization there is formed a polymer of 2-acrylamido-2-methylpropane sulfonate/styrene/butyl acrylate/acrylic acid, 2-acrylamido-2-methylpropane sulfonate/styrene/butyl acrylate, or vinyl sulfonate/styrene/butyl acrylate/acrylic acid; a process wherein the colorant possesses a particle size distribution wherein at least about 90 percent of the colorant particles are of a diameter of about 0.1 μm with the remaining colorant particles being of a diameter of about 1.0 μm; a process wherein the latex contains water; a process wherein there is added to the ink obtained ink additives; a process wherein the additives are surfactants of poly(ethylene glycol) monolaurate, poly(ethylene glycol) monoricinoleate, poly(ethylene glycol) lanolin alcohol ether, poly(ethylene glycol) monooleate, poly(ethylene glycol) castor oil, poly(ethylene glycol) tetramethyl decynediol, or poly(ethylene glycol) lanolin, and which surfactants are optionally present in an amount of from about 0.01 to about 7 weight percent or parts based on the total amount of ink components; a process wherein the additives are comprised of a biocide, a humectant, or mixtures thereof; a process wherein the vehicle is water, a glycol, or a mixture of glycols; a high resolution printing process comprising applying in image-wise fashion to a substrate the ink compositions illustrated herein; a process wherein the substrate is paper, and there is selected a printer with at least one nozzle of a channel width or diameter ranging from about 10 to about 40 microns and intercolor bleed is minimized or eliminated, and wherein the printing process is optionally accomplished with a 600 spi ink jet printer with a radiant heat assisting drying process; a process wherein subsequent to polymerization there is formed a polymer, such as a polymer selected from the group consisting of poly(2-acrylamido-2-methylpropanesulfonate-styrene-butyl acrylate-acrylic acid), poly(2-acrylamido-2-methylpropanesulfonate-styrene-acrylon itrile-acrylic acid), poly(2-acrylamido-2-methylpropane sulfonate-styrene-butadiene-acrylic acid), poly(2-acrylamido-2-methyl propanesulfonate-styrene-vinyl acetate-acrylic acid), poly(2-acrylamido-2-methylpropanesulfonate-styrene-butyl acrylate-methacrylic acid), poly(2-acrylamido-2-methylpropanesulfonate-styrene-butyl acrylate), poly(2-acrylamido-2-methylpropanesulfonate-benzyl methacrylate-acrylic acid), poly(2-acrylamido-2-methylpropanesulfonate-benzyl methacrylate-butyl acrylate), poly(2-acrylamido-2-methylpropanesulfonate-styrene-ethyl acrylate-acrylic acid), poly(2-acrylamido-2-methylpropanesulfonate-butyl methacrylate-methacrylic acid), poly(2-acrylamido-2-methylpropane sulfonate-benzyl methacrylate-methacrylic acid), poly(2-acrylamido-2-methylpropanesulfonate-butyl acrylate-methacrylic acid), poly(vinyl sulfonate-styrene-butyl acrylate-acrylic acid), poly(vinyl sulfonate-styrene-butyl acrylate), poly(vinyl sulfonate-styrene-acrylonitrile-acrylic acid), poly(vinyl sulfonate-styrene-butadiene-acrylic acid), poly(vinyl sulfonate-styrene-vinyl acetate-acrylic acid), poly(vinyl sulfonate-styrene-butyl acrylate-methacrylic acid), poly(vinyl sulfonate-ethyl methacrylate-acrylic acid), poly(vinyl sulfonate-benzyl methacrylate-acrylic acid), poly(vinyl sulfonate-styrene-methyl acrylate-acrylic acid), poly(vinyl sulfonate-styrene-ethyl acrylate-acrylic acid), poly(vinyl sulfonate-butyl methacrylate-butyl acrylate), poly(vinyl sulfonate-benzyl methacrylate-methacrylic acid), and preferably, poly(2-acrylamido-2-methylpropanesulfonate-styrene-butyl acrylate-acrylic acid), poly(2-acrylamido-2-methylpropanesulfonate-styrene-butyl acrylate), poly(2-acrylamido-2-methylpropanesulfonate-benzyl methacrylate-acrylic acid), and poly(vinyl sulfonate-styrene-butyl acrylate-acrylic acid); a process wherein subsequent to polymerization there is formed a polymer selected from the group consisting of poly(2-acrylamido-2-methylpropanesulfonate-styrene-butyl acrylate-acrylic acid), poly(2-acrylamido-2-methylpropanesulfonate-styrene-acrylonitrile-acrylic acid), poly(2-acrylamido-2-methylpropane sulfonate-styrene-butadiene-acrylic acid), poly(2-acrylamido-2-methylpropanesulfonate-styrene-vinyl acetate-acrylic acid), poly(2-acrylamido-2-methylpropanesulfonate-styrene-butyl acrylate-methacrylic acid), and poly(2-acrylamido-2-methylpropanesulfonate-styrene-butyl acrylate); a process wherein subsequent to polymerization there is formed a polymer selected from the group consisting of poly(2-acrylamido-2-methylpropanesulfonate-benzyl methacrylate-acrylic acid), poly(2-acrylamido-2-methylpropanesulfonate-benzyl methacrylate-butyl acrylate), poly(2-acrylamido-2-methylpropanesulfonate-styrene-ethyl acrylate-acrylic acid), poly(2-acrylamido-2-methylpropanesulfonate-butyl methacrylate-methacrylic acid), poly(2-acrylamido-2-methylpropanesulfonate-benzyl methacrylate-methacrylic acid), poly(2-acrylamido-2-methylpropane sulfonate-butyl acrylate-methacrylic acid), poly(vinyl sulfonate-styrene-butyl acrylate-acrylic acid), poly(vinyl sulfonate-styrene-butyl acrylate), poly(vinyl sulfonate-styrene-acrylonitrile-acrylic acid), and poly(vinyl sulfonate-styrene-butadiene-acrylic acid), or mixtures thereof; a process wherein subsequent to polymerization there is formed a polymer of poly(vinyl sulfonate-styrene-butyl acrylate-acrylic acid); a process which comprises contacting a colorant and a latex containing an ionic sulfonate monomer, and wherein the latex is generated by the polymerization of a mixture of olefinic monomers, and wherein at least one of the olefinic monomers is an ionic sulfonate monomer; a process wherein the polymerization is accomplished in the presence of an anionic surfactant, and a nonionic surfactant; a process wherein the polymerization is accomplished by heating; a process wherein the styrene functional monomer is selected from the group consisting of styrene, α-methylstyrene, 4-methylstyrene, 3-chlorostyrene, 2,5-dichlorostyrene, 4-bromostyrene, 4-tert-butylstyrene, and 4-methoxystyrene; ink compositions comprised of colorant, polymer, and certain additives; inks comprised of a major amount of a vehicle, like water, colorant, such as dye, pigment, or mixtures thereof, a polymer containing an ionic sulfonate segment, and known ink additives, such as biocides, humectants, polymeric additives, stabilizer additives, and the like, and an ink comprised of a vehicle, colorant, and ionic sulfonate resin emulsion, and wherein the ionic sulfonate resin emulsion contains water, surfactant, resin particles obtained from the emulsion polymerization of a mixture of olefinic monomers, and wherein at least one of the olefinic monomers is an ionic sulfonate monomer.

The ink vehicle is generally present in an amount of from about 50 to about 99, from about 60 to about 80, and other suitable amounts, percent by weight, the colorant is generally present in an amount of from about 1 to about 20 and from about 5 to about 12 percent by weight, the ionic sulfonate polymer, or resin is generally present in an amount of from about 0.05 to about 20 and from about 3 to about 15 percent by weight, a biocide is generally present in an amount of from about 0 to about 10 percent by weight, a humectant is generally present in an amount of from about 0 to about 50 percent by weight, a polymeric additive is generally present in an amount of from about 0 to about 10 percent by weight, a stabilizer additive is generally present in an amount of from about 0 to about 5 percent by weight, based on the total amount of components in the ink. The inks in embodiments possess a latency of at least about 10, and for example from about 15 to about 50 seconds, in a printer having at least one nozzle of a channel width or diameter ranging, for example, from about 10 to about 40 microns, and wherein intercolor bleed is minimized or eliminated. An important measured property for an ink jet ink is the latency or decap time, which is the length of time over which an ink remains fluid in a printhead opening or nozzle when exposed to air and, therefore, capable of firing a drop of ink at its intended target. Latency refers, for example, to the maximum idling times allowed for ink to be jetted by a printer with a speed equal to or greater than 5 m/s (equivalent to an ink traveling a distance of 0.5 millimeter in less than 100 $\mu$s) without a failure. This test is operated with the printhead or nozzles uncovered or decapped, and generally at a relative humidity of 15 percent. The time interval is the longest length of time that the printhead, uncovered, will still fire a specified drop without drop displacement or loss of density. The longer the latency time rating, the more desirable the ink. The inks of the present invention possess many of these characteristics in embodiments thereof.

Inks of the present invention can be prepared by the formation of a latex generated by the polymerization of a monomer or monomers and an ionic monomer containing sulfonate groups, and subsequently aggregating and fusing the latex polymer with a colorant. The aggregating and fusing can be accomplished as illustrated in a number of the Xerox United States patents recited herein.

More specifically, the processes of the present invention comprise the generation, preferably by emulsion polymerization, of a latex containing monomer and a monomer with ionic sulfonate groups and which monomer is, for example, of the formula $CH_2=CR(R')_mSO_3X$ wherein R is hydrogen or alkyl, R' is alkylene, —CO—$R_2$ wherein $R_2$ is amino substituted with alkyl or hydrogen, $(CH_2)_n$—O, wherein n represents a number of from about 0 to about 5; X is hydrogen, or a monovalent cation such as ammonium, sodium, or potassium, and m represents the number of segments of R' and wherein m is preferably 0 or 1. Ionic sulfonate monomer examples selected for the preparation of ionic sulfonate latex polymers are acrylamide sulfonate monomers, sodium sulfoethyl methacrylate, sodium 1-allyloxy 2-hydroxy propane sulfonate, sodium vinyl sulfonate, and potassium vinyl sulfonate. The acrylamide sulfonate monomer or compound can be of many different types, for example the acrylamido residue can be acrylamido, methacrylamido or crotonyamido (methyl or H in the α or β position of the acrylamide). The sulfonate residue is preferably a $C_2$–$C_{11}$ alkylsulfonate. Examples include propane sulfonate or 2-alkylpropane sulfonate where alkyl is a $C_2$–$C_8$ alkyl group. Specific examples of suitable acrylamide sulfonate monomers include sodium 2-methylacrylamido-propanesulfonate, sodium 2-crotonylamino-propanesulfonate, sodium 2-acrylamido-2-propane sulfonate, sodium 2-acrylamido-2-methylpropane sulfonate, ammonium 2-acrylamido-2-methylpropane sulfonate, potassium 2-acrylamido-2-methylpropanesulfonate, 2-acrylamido-2-propanesulfonic acid, 2-methacrylamido-2-methylpropanesulfonate, sodium 2-crotonylamido-2-methylpropanesulfonate, with the preferred acrylamide sulfonate monomer being ammonium 2-acrylamido-2-methylpropanesulfonate.

The ionic sulfonate latex polymer can be prepared by a free radical-initiated aqueous emulsion polymerization of a mixture of unsaturated ionic sulfonate monomers and ethylenically unsaturated monomers by heating at, for example, temperatures of between about 40° C. to about 90° C., wherein the resulting ionic sulfonate latex polymer possesses, for example, a number average molecular weight of from about 1,000 grams per mole to about 100,000 grams per mole, and a weight average molecular weight of from about 1,500 grams per mole to about 300,000 grams per mole, and a glass temperature of from about 20° C. to about 95° C. The ionic sulfonate polymer emulsion is preferably comprised of from about 1 to about 40 weight percent of polymer particles, wherein the ionic sulfonate polymer in the polymer emulsion is comprised of from about 0.05 to about 10 weight percent of ionic sulfonate groups based on the ionic sulfonate polymer, and which polymer is preferably of average diameter of from about 30 nanometers to about 500 nanometers. The ionic sulfonate monomers characteristically contain sulfonate functionality and pendant ethylenic double bond unsaturation, and such monomers include acrylamide sulfonate monomer or compound, sodium sulfoethyl methacrylate, sodium 1-allyloxy 2-hydroxy propane sulfonate, sodium vinyl sulfonate, and potassium vinyl sulfonate. Preferred ionic sulfonate monomers are acrymide sulfonate monomers or compounds. The acrylamide sulfonate monomer or compound useful can be of many different types, for example the acrylamido residue can be acrylamido, methacrylamido or crotonyamido (methyl or H in the α or β position of the acrylamide). The sulfonate residue is preferably a $C_2$–$C_{11}$ alkylsulfonate. Examples include propane sulfonate or 2-alkylpropane sulfonate where the alkyl is a $C_2$–$C_8$ alkyl group. Specific examples of suitable acrylamide sulfonate monomers include sodium 2-methylacrylamido-propanesulfonate, sodium 2-crotonylamino-propane sulfonate, sodium 2-acrylamido-2-propanesulfonate, sodium 2-acrylamido-2-methylpropanesulfonate, ammonium 2-acrylamido-2-methylpropane sulfonate, potassium 2-acrylamido-2-methylpropanesulfonate, 2-acrylamido-2-propanesulfonic acid, 2-methacrylamido-2-methylpropanesulfonate, sodium 2-crotonylamido-2-methylpropanesulfonate. The most preferred acrylamide sulfonate monomer for use in the invention is ammonium 2-acrylamido-2-methylpropanesulfonate. The ionic sulfonate monomers can be copolymerized with ethylenically unsaturated monomers which include, for example, vinyl aromatic and aliphatic hydrocarbons such as styrene, a-methyl styrene and similar substituted styrenes, vinyl naphthalene, vinyl toluene, divinyl benzene, and vinyl aliphatic hydrocarbons such as 1,3-butadiene, methyl-2-butadiene, 2,3-dimethyl butadiene, cyclopentadiene and dicyclopentadiene, ethylenically unsaturated esters such as acrylic, methacrylic, cinnamic and crotonic and the like, and esters containing fumaric and maleic type unsaturation, and acid olefinic monomers such as acrylic acid, methacrylic acid, itaconic acid, fumaric acid, maleic acid, sodium acrylate, potassium acrylate, and the like. Particularly preferred monomers include, for example, styrene, 1,3-butadiene, isoprene, alkyl (meth)acrylates such as ethyl acrylate, butyl acrylate, methyl methacrylate, butyl methacrylate, acrylonitrile, vinyl acetate, acrylic acid, and methacrylic acid.

Generally, the ionic sulfonate monomer selected, such as ammonium 2-acrylamido-2-methylpropanesulfonate, 2-acrylamido-2-methylpropanesulfonic acid, sodium vinyl sulfonate, or mixture thereof, is selected in an amount of, for example, from about 0.5 to about 15 weight percent of the resin (the ionic sulfonate copolymer resin) of, for example, the poly(styrene-butyl acrylate-acrylic acid-2-methacrylamido-2-methylpropane sulfonate). The ethylenically unsaturated ester or styrene functional monomer can be selected, for example, in an amount of from about 65 to about 99 percent by weight of the resins, and amount of the olefinic acidic monomer or monomers selected, such as acrylic acid or methacrylic acid, is, for example, from about 0 to about 25 weight percent.

The free radical initiator selected is generally an emulsion type initiator, such as a persulfate like potassium or ammonium persulfate, and chain transfer agents can be utilized to adjust the molecular weight of the resin and for adjusting the resin particle to solubilized resin ratio. Chain transfer agents selected include alkylthiol, such as dodecanethiol, about 0.1 to about 10 percent on weight, halogenated carbons, such as carbon tetrabromide, about 0.1 to about 10 percent on weight, based on the monomer, or monomers used to prepare the ionic sulfonate copolymer resin, or preferably a mixture of alkylthiol and halogenated carbon. Surfactants can also be incorporated into the resin emulsion, such as anionic, cationic and nonionic surfactants, wherein the effective amount of anionic surfactant is from about 0.1 to about 10 percent on weight, the effective amount of nonionic surfactant is from about 0.1 to about 6 percent, the effective amount of cationic surfactant is from about 0.1 to about 5 percent by weight based on, for example, the monomer, or monomers used to prepare the ionic sulfonate copolymer resin.

In one specific embodiment, the resin emulsion is prepared by charging a half liter kettle equipped with a mechanical stirrer with from about 380 to about 400 grams of water, about 18 to about 20 grams of sodium dodecylbenzene sulfonate anionic surfactant, NEOGEN R™ (20 percent active, available from Kao), and from about 5 to about 7 grams of polyoxyethylene nonyl phenyl ether nonionic surfactant, ANTAROX CA897™ (70 percent active, available from Rhone Poulenc). The resulting mixture is then stirred for about 0.5 hour at about 100 to about 200 revolutions per minute. To this solution is then added about 2.5 to about 3.5 grams of ammonium persulfate, followed by the addition of an organic mixture containing from about 2 to about 15 grams of ammonium 2-acrylamido-2-methylpropanesulfonate, about 200 to about 240 grams of styrene, about 40 to about 70 grams of butyl acrylate, 0 to about 8 grams of acrylic acid, about 0 to about 10 grams of dodecanethiol, and from about 0 to about 5 grams of carbon tetrabromide. The mixture is then heated to about 70° C. to about 80° C. (Centigrade) for a duration of, for example, from about 3 to about 16 hours. The product can then be cooled to room temperature, and a sample (about 10 grams) freeze dried and analyzed by GPC resulting in a latex resin with, for example, a number average molecular of about 5,000 to about 100,000, a weight average molecular weight of about 8,000 to about 300,000 grams per mole and a polydispersity of about 2 to about 5; and a resin, a glass temperature from about 25° C. to about 80° C. as analyzed by DSC.

Moreover, the inks contain penetrants of N-methylpyrrolidinone, sulfoxides, ketones, lactones, esters, alcohols, butyl carbitol, benzyl alcohol, cyclohexylpyrrolidinone, 1,2-hexanediol, and the like present in an amount of, for example, from about 0.01 percent to 20, from about 3 to about 15 percent by weight.

The present invention also relates to a high resolution printing process comprising applying in imagewise fashion to a substrate the invention ink in a printer having at least one nozzle of a channel width or diameter ranging from about 10 to about 40 microns, and wherein intercolor bleed is minimized or eliminated, and wherein the printing process is optionally accomplished with a 600 spi ink jet printer with a radiant heat assisting drying process; a printing process which comprises incorporating into an acoustic ink jet printer the invention ink with a viscosity of from about 0.7 to about 5 centipoise at a temperature of from about 25° C. to about 50° C., and causing droplets of the ink to be ejected in imagewise pattern onto a substrate; a process which comprises (a) providing a acoustic ink printer having a pool of liquid ink with a free surface, and a printhead including at least one droplet ejector for radiating the free surface of the ink with focused acoustic radiation to eject individual droplets of ink therefrom on demand, the radiation being brought to focus with a finite waist diameter in a focal plane, and which ink possesses a viscosity of from about 0.7 to about 5 centipoise at a temperature of from about 25° C. to about 50° C., and (b) causing droplets of the ink to be ejected onto a recording sheet in an imagewise pattern at a temperature of from about 20° C. to about 50° C.; an imaging process which comprises the development of an image with an aqueous ink jet ink composition comprised of colorant, such as dye or pigment, water, and additives as indicated herein, and wherein images with acceptable, or low intercolor bleed, photo like quality, waterfastness, for example from about 90 to about 99 percent, and minimal curling and minimal smearing are obtained; and a high resolution printing process comprising applying in imagewise fashion to a substrate in a printer having at least one nozzle of a channel width or diameter ranging from about 10 to about 40 microns. Also, the inks and imaging processes of the present invention in embodiments thereof can possess numerous advantages including excellent ink waterfastness, lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, a lack of printhead kogation, and more importantly, wherein the inks when selected for ink jet processes enable photo like quality, and low intercolor bleed, on substrates such as paper.

Examples of vehicles selected for the inks of the present invention include water, glycols, mixtures of glycols, a mixture of water and a miscible organic component, such as a glycol, such as ethylene glycol, propylene glycol, diethylene glycols, glycerine, dipropylene glycols, polyethylene glycols, polypropylene glycols and the like, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. The liquid vehicle is generally present in an amount of from about 50 to about 99 and preferably from about 95 to about 99 percent by weight, based on total amount of components in the ink, and more preferably from about 55 to about 95 percent by weight, and still more preferably from about 60 to about 90 percent by weight, although the amounts may be outside these ranges in embodiments. The total of all ink components is about 100 percent, or 100 parts. Also, there can be selected other vehicles not specifically recited herein.

When mixtures of water and water miscible organic liquids are selected as the liquid vehicle, the water to organic ratio may be in any effective range, and typically is from about 100:0 to about 30:70, and preferably from about 97:3 to about 50:50, although the ratio can be outside these ranges. The nonwater component of the liquid vehicle generally serves as a humectant and possesses a boiling point higher than that of water (100° C.). The colorant, such as a pigment dispersion can be mixed with different humectants or solvents including ethyleneglycol, diethyleneglycol, propyleneglycol, dipropylene glycol, polyethyleneglycols, polypropylene glycols, glycerine, trimethylolpropane, 1,5 pentanediol, 1,6 hexanediol, diols and triols containing 2 to 10 carbons, sulfoxides, for example dimethylsulfoxide, alkylphenyl sulfoxides or sulfones like sulfolane, dialkyl sulfones, alkyl phenyl sulfones, and the like, amides, for example N,N-dialkyl amides, N,N-alkyl phenyl amides, 3-methyl-2-oxazolidinone, isosorbide dimethyl ether, N-methylpyrrolidinone, N-cyclohexylpyrrolidinone, N,N-diethyltoluamide, and the like, ethers such as alkyl ether derivatives of alcohol, etherdiols, and ether triols including butylcarbitol, alkyl polyethyleneglycols, and the like, urea, betaine, or the thio (sulfur) derivatives of the aforementioned materials, for example, thioethyleneglycol, trithioethyleneglycol, and the like. Known desired penetrants, water soluble polymers, surfactants, pH buffer, biocides, chelating agents (EDTA, ethylene diamine tetraamine, and the like), can also be selected for the inks of the present invention.

Polymer latex examples, and which polymers are generated. from the polymerization of monomers, include known ionic sulfonate polymers such as poly(2-acrylamido-2-methylpropanesulfonate-styrene-butyl acrylate-acrylic acid), poly(2-acrylamido-2-methylpropanesulfonate-styrene-acrylonitrile-acrylic acid), poly(2-acrylamido-2-methylpropanesulfonate-styrene-butadiene-acrylic acid), poly(2-acrylamido-2-methylpropane sulfonate-styrene-vinyl acetate-acrylic acid), poly(2-acrylamido-2-methylpropanesulfonate-styrene-butyl acrylate-methacrylic acid), poly(2-acrylamido-2-methylpropanesulfonate-styrene-butyl acrylate), poly(2-acrylamido-2-methylpropanesulfonate-benzyl methacrylate-acrylic acid), poly(2-acrylamido-2-methylpropanesulfonate-benzyl methacrylate-butyl acrylate), poly(2-acrylamido-2-methylpropanesulfonate-styrene-ethyl acrylate-acrylic acid), poly(2-acrylamido-2-methylpropanesulfonate-butyl methacrylate-methacrylic acid), poly(2-acrylamido-2-methylpropane sulfonate-benzyl methacrylate-methacrylic acid), poly(2-acrylamido-2-methylpropanesulfonate-butyl acrylate-methacrylic acid), poly(vinyl sulfonate-styrene-butyl acrylate-acrylic acid), poly(vinyl sulfonate-styrene-butyl acrylate), poly(vinyl sulfonate-styrene-acrylonitrile-acrylic acid), poly(vinyl sultonate-styrene-butadiene-acrylic acid), poly(vinyl sulfonate-styrene-vinyl acetate-acrylic acid), poly(vinyl sulfonate-styrene-butyl acrylate-methacrylic acid), poly(vinyl sulfonate-ethyl methacrylate-acrylic acid), poly(vinyl sulfonate-benzyl methacrylate-acrylic acid), poly(vinyl sulfonate-styrene-methyl acrylate-acrylic acid), poly(vinyl sulfonate-styrene-ethyl acrylate-acrylic acid), poly(vinyl sulfonate-butyl methacrylate-butyl acrylate), poly(vinyl sulfonate-benzyl methacrylate-methacrylic acid), and preferably, poly(2-acrylamido-2-methylpropanesulfonate-styrene-butyl acrylate-acrylic acid), poly(2-acrylamido-2-methylpropanesulfonate-styrene-butyl acrylate), poly(2-acrylamido-2-methylpropanesulfonate-benzyl methacrylate-acrylic acid), poly(vinyl sulfonate-styrene-butyl acrylate-acrylic acid), and the like. The latex polymer, or resin is generally present in various suitable amounts, such as from about 0.05 to about 20, and preferably from about 0.10 to about 10 weight percent of the ink, and the latex size can be, for example, from about 0.01 micron to about 1 micron, and preferably from about 0.05 micron to about 0.5 micron in volume average diameter as measured by Coulter Counter nanosize particle analyzer.

The colorant for the ink compositions of the present invention includes dyes, pigments, mixtures of dye and pigment, mixture of dyes, a mixture of one or more pigments, and the like. The colorant can be black, cyan, magenta, yellow, red, blue, green, orange, brown, mixtures thereof, and the like, and is preferably carbon black, such as Levanyl carbon black obtained from Bayer. Examples of suitable black pigments include various carbon blacks such as channel black, furnace black, lamp black, and the like. Colored pigments, or dyes include red, green, blue, brown, magenta, cyan, yellow, and mixtures thereof. Illustrative examples of magenta pigments include 2,9-dimethyl-substituted quinacridone and anthraquinone, identified in the Color Index as Cl 60710, Cl Solvent Red 19, and the like; examples of cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like; and examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Preferably the colorant dispersions include carbon blacks, such as Hostafine Black (T and TS), Sunsperse 9303, Cabot CSC-440L and Levanyl Black A-SF. Of these, Levanyl Black A-SF and Cabot CSX-440L are the most preferred. Examples of suitable colorants, especially pigments that may be selected in embodiments are illustrated in U.S. Pat. No. 5,556,727, the disclosure of which is totally incorporated herein by reference.

Examples of dyes include reactive dyes, direct dyes, anionic dyes, acid dyes, food dyes, and the like. Specific examples of suitable dyes include the ProJet dyes available from Zeneca (ICI) such as ProJet Yellow 1G, ProJet Yellow OAM, and ProJet Fast Yellow 2, ProJet Cyan 1, ProJet Fast Cyan 2, ProJet Magenta 3B-OA, ProJet Magenta 1T, ProJet Magenta 1, ProJet Fast Magenta 2, ProJet Fast Black 2. Other dyes are also suitable for the embodiments of this invention: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brilliant Flavine 6G-N, available from Bayer, Bayscript Magenta WDP, available from Bayer, Duasyn Acid Rhodamine B-SF, available from Hoechst, Bayscript Yellow BR, available from Bayer, Bayscript Cyan BA Liquid, available from Bayer, Special Black HF Liquid, available from Bayer, Special Yellow CA51089FW, available from Bayer, Acid Yellow 17, available from Tricon.

Preferably, the colorant, especially pigment particle size is small to enable a stable colloidal suspension of the particles in the liquid vehicle and to prevent clogging of the ink channels when the ink is used in a thermal ink jet printer. Preferred colorant particle average diameters are generally from about 0.001 to about 2 microns, and more preferably from about 0.01 to about 1 micron in volume average diameter, although the particle size can be outside these ranges. A more preferred colorant particle size includes particles having at least 70 percent of the particles being below about 0.1 micron with no particles being greater than 1.0 micron (measured on a Hodaka CAPA 700 Particle Size Analyzer). More preferably, the pigment particle size includes particles having at least 90 percent of the particles being below 0.1 micron with no particles being greater than about 1.0 micron.

The colorant is present in the ink composition in various effective amounts and generally from about 1 to about 20 percent by weight, preferably from about 3 to about 10 percent by weight, more preferably from about 4 to about 9 percent by weight, and most preferably from about 4 to about 8 percent, although the amount can be outside of these ranges.

Latex anionic surfactants include sodium dodecylsulfate (SDS), sodium dodecylbenzene sulfonate, sodium dodecyinaphthalene sulfate, sodium diphenyloxide disulfonates, dialkyl benzenealkyl, sulfates and sulfonates, abitic acid, available from Aldrich, NEOGEN R™, NEOGEN SC™ obtained from Kao, and the like. Examples of cationic surfactants are dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}, C_{15}, C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, and which surfactants are selected in effective amounts of, for example, from about 0.01 percent to about 10 percent by weight of the monomers used to prepare the polymer latex.

Examples of nonionic surfactants are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, available from Union Carbide as Triton X-100™, Triton X-405™, Triton X-705™, and hydrolyzable or cleavable nonionic surfactants of the formulas illustrated in U.S. Ser. No. 120,649, such as poly (ethylene glycol) methyl p-tert-octylphenyl phosphate, wherein the surfactant contains, for example, 40 ethylene glycol units, poly(ethylene glycol)-α-methyl ether-ω-methyl p-tert-octylphenyl phosphate (wherein the surfactant contains 17 ethylene glycol units). These surfactants can be selected in various effective amounts, such as for example from about 0.1 to about 10 percent, and from 1 to about 5 weight percent by weight of the monomers used to prepare the polymer latex.

Polymeric additives can also be added to the inks for example, to enhance the viscosity of the ink, include water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the DISCOLE® series available from DKS International, Tokyo, Japan, the JEFFAMINE® series available from Texaco, Bellaire, Tex., and the like. The polymeric additives may be present in the ink of the present invention in amounts of from 0 to about 10 percent by weight, preferably from about 0.001 to about 8 percent by weight, and more preferably from about 0.01 to about 5 percent by weight, although the amount can be outside these ranges. A preferred polymeric additive is illustrated in copending application U.S. Ser. No. 536,236, the disclosure of which are totally incorporated herein by reference, which additives are especially useful as pigment like carbon black stabilizers. The self-emulsifying sulfolated polyesters disclosed in U.S. Ser. No. 536,236 can be selected as additives in various appropriate amounts and preferably in amounts of from about 0.1 weight percent to about 12 weight percent and more preferably from about 1 weight percent to about 8 weight percent. The preferred polyesters have a glass transition temperature ranging from about 0° to about 80° C. and preferably between about 20° C. and about 65° C. One selected polyester is a sulfonated polyester with about 7.5 percent sulfonation, weight average molecular weight of about 2,080, $M_n$ of about 1,043, Tg of about 54.9° C., and softening point of about 135° C.

Examples of specific optional ink additives that may be selected include biocides, such as DOWICIL® 150 (o-phenylphenol), 200 (Quatemium-15), and 75 (1-(3-chloroallyl)-3,5,7-triaza-1-azoniaadamantane chloride), benzoate salts, sorbate salts, 1,2-benzisothiazolinone also known as Proxel GXL products obtained from Zeneca Chemicals and the like, present in an amount of from 0 to about 10 percent by weight, preferably from about 0.001 to about 8 percent by weight, and more preferably from about 0.01 to about 4.0 percent by weight, although the amount can be outside these ranges; penetration control additives, such as N-methylpyrrolidinone, 2-pyrrolidinone, sulfoxides, ketones, lactones, esters, alcohols, butyl carbitol, benzyl alcohol, cyclohexylpyrrolidinone, 1,2-hexanediol, and the like, present in an amount from 0 to about 50 percent by weight, and preferably from about 1 to about 30 percent by weight, although the amount can be outside these ranges; pH controlling agents, such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges; and penetrants, as illustrated herein, such as butyl carbitol, and cyclohexylpyrrolidinone in amounts, for example, of from about 0.1 to about 20 percent by weight and preferably from about 0.5 to about 10 percent by weight, and the like.

Examples of suitable ink additives include those as illustrated in U.S. Pat. No. 5,223,026 and U.S. Pat. No. 5,207,825, the disclosures of each patent being totally incorporated herein by reference. Examples of these additives include the alcohol surfactants illustrated herein, and more specifically, a mixture of secondary alcohols reacted with ethylene oxide, such Tergitol 15-S series surfactants available from Union Carbide, polyethylene oxide, alkylphenoxy-polyethylene oxide, such as Triton X-100 available from Aldrich Chemical Company, polyethylene oxide nonylphenyl ether available as IGEPAL from Aldrich Chemical Company, or as ANTAROX from Rhone Poulenc. The surfactants are utilized in various effective amounts, such as for example from about 0 to about 5 percent, and from 1 to about 3 weight percent by weight of the ink.

For the final ink jet ink compositions of the present invention, a number of physical properties may be desirable, for example ink compositions for use in ink jet recording processes should have appropriate viscosity, surface tension and pH characteristics. Also, the ink should possess liquid properties, such as viscosity, surface tension and pH, optimized for the discharging conditions of the printing apparatus, such as the thermal ink jet heater temperature increase, surface tension of the colorant, such as pigment dispersions should, for example, be greater than about or equal to about 30 dynes/cm$^2$, preferably greater than about 45 dynes/cm$^2$, and more preferably greater than about 60, such as from about 70 to about 100 dynes/cm$^2$. The ink compositions possess surface tensions of, for example, greater than about 25 dynes/cm$^2$, preferably greater than about 30 dynes/cm$^2$ and more preferably greater than about 40, such as from about 40 to about 100, dynes/cm$^2$ and the viscosity of the ink composition is, for example, less than about or equal to about 10 cps, preferably less than about 8 cps, and more preferably less than about 5 cps, such as from about 1 to about 5 cps. The surface tension can be measured with a Kruss Model K10 tensiometer, and the viscosity can be determined at about 25° C. by a Brookfield Fluid Rheometer.

The inks of the present invention possess in embodiments superior ink stability, for example they maintain a substantially constant viscosity as measured by a Brookfield Fluid Rheometer, a suitable pH as measured by a pH electrode and meter, and an effective surface tension as measured by a fluid tensiometer. Moreover, the inks do not exhibit visible pigment or emulsion particle settling behavior for extended time periods, for example over six months, and more specifically, from about six months to about two years.

The substantially constant viscosity, pH, surface tension, and lack of particulate settling is maintained despite stressing the ink by, for example, permitting the ink to remain in a bottle at room temperature, for example about 25° C., then subjecting the ink to heating at about 60° C. (Centigrade) for 24 hours or 50° C. for 30 days; or subjecting the ink to freezing at –30° C. followed by thawing at room temperature. Under these stress conditions, the viscosity of the ink does not substantially increase or decrease more than about 0.5 cPs (centipoise). A substantial viscosity change, for example from 3 centipoise (cPs) to about 4 centipoise, may cause the ink to be nonjettable, and/or may render the ink incapable of passing through the jetting device filter. An adverse change in ink viscosity may result in the lack of refilling ink to the jetting device, and thus subsequent loss of jetting channel refill and drops not being fired from the jetting device. Subjecting the inks to temperatures below about 0 degrees Celsius, such as –40° C., and thereafter thawing the inks, an extreme condition which may occur during transportation of the ink in winter, or cold climates, evidenced no visible ink settling or precipitate of the ink, such as the pigment, the resin emulsion particles, and pigment with other ink components. Visible settling or precipitates, after the ink has remained at 25° C., would cause ink jet nozzle clogging, and therefore, effect the line edge raggedness, optical density, or mottle of the images. Also, the settling of the ink would permit a nonhomogeneous mixture which may also cause storage problems such as in an ink tank containing a wicking device. Further, the inks of the present invention do not require additional special additives, such as the prior art saccharine/polyols, for long shelf stability or excellent jetting performance.

The inks of the present invention possess excellent latency. Generally, the inks possess a functional latency of at least 10 seconds, more generally on the order of 20 seconds to greater than 1,000 seconds, with a minimum latency of at least about 30 seconds being preferred.

The inks may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, or the like, coated papers, such as those available from Jujo, transparency materials suitable for aqueous inks or ink jet printing processes, or the like.

The following Examples are provided.

EVALUATIONS

The properties of the following prepared ink compositions were evaluated as follows:

A) Physical Properties:

The viscosity of the ink was measured at 25° C. using a Brookfield Model DV-11 viscometer.

The surface tension of the ink was measured at 25° C. using a Kruss model K10T plate tensiometer.

The pH was measured at 25° C. using a Corning model 345 pH meter.

B) Stability:

50 Grams of ink were placed in a capped bottle and allowed to stand or remain at a temperature of 60° C. for 24 hours. The inks physical properties were measured after heat treatment. For comparison, the shelf standing ink life was also measured for physical properties. Large changes greater than 0.3 centipoise units for viscosity usually indicate instability. Other physical properties, such as surface tension or pH, were monitored, and changes of 3 dynes/cm or a change in pH by more than about 0.5 indicate instability. Observation of the ink standing on the shelf at room temperature, about 25° C. throughout, for settling was also tested.

Thermal stability is also important for pigmented ink systems. Heat treatment at 60° C. for 24 hours provides an indication of the inks stability. Monitoring of physical properties is a tool for assessing the stability. Deviations of 0.3 or greater in viscosity can be a cause for concern as the ink properties in the printhead could change and cause nonuniformity in drops seen on printed paper. Also shelf life would be of concern if the ink does not withstand these conditions. The ink will not function properly if the thermal stability is compromised, such as ejection efficiency, optical density would be decreased and phase separation of the ink would occur at the front face of the printhead.

C) Optical Density:

An image was printed by an ink jet printer HP855C on each of the following papers: Xerox Courtland 4024DP and Images Series LX. The optical density of the printed image was measured by an X-Rite densitometer.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, or the like, coated papers, such as those available from Jujo, transparency materials suitable for aqueous inks or ink jet printing processes, or the like.

D) Procedure For Identifying Kogation:

To monitor the kogation behavior, droplets of ink were added to an open faced heater and electrical current was applied to generate bubble formation. The pulsing continued run to $10^8$ pulses at 38 Volts at 2 KHz. The heater was then removed and examined underneath a microscope for heater deposit examination. In addition, the heater was rinsed with DI (deionized) water and reexamined to observe if particulates were removed. This assists in identifying the severity of the depositions on the heaters. Reported is the before rinsing process. Having the heaters covered with debris, an early sign of kogation, since the number of pulses is fairly small compared to the expected life of the heaters in a printer machine. When heaters are covered with debris, this will insulate the heaters, hence less energy is available to form the ink bubble to generate the appropriate drop size. To the consumer, the image printed over time would decrease in optical density and generate streaky prints, with the additional failure of the heaters.

Example I

An ionic sulfonate latex emulsion comprised of polymer particles derived from emulsion polymerization of ammonium 2-methacrylamido-2-methylpropanesulfonate, styrene, butyl acrylate, acrylic acid, 2/77/23/2 parts (by weight), was prepared as follows.

In a 1,000 milliliter jacketed glass flask equipped with a mechanical stirrer, 2.7 grams of ammonium persulfate, 19.2 grams of sodium dodecylbenzene sulfonate anionic surfactant, NEOGEN R™ (20 percent active, available from Kao), 5.8 grams of polyoxyethylene nonyl phenyl ether nonionic surfactant, ANTAROX CA897™ (70 percent active, available from Rhone Poulenc), and 391 grams of deionized water were deaerated for 30 minutes. A monomer mixture of 10.8 grams of AMPS 2411™ (ammonium 2-methacrylamido-2-methylpropanesulfonate, 50 percent active, available from Lubrizol), 208 grams of styrene, 62 grams of butyl acrylate, and 5.4 grams of acrylic acid, and 7.4 grams of dodecanethiol was charged into the flask and the resulting mixture was emulsified for 10 minutes at room temperature, about 25° C. (Centigrade) throughout. This emulsion was then polymerized at 80° C. for 6 hours in a nitrogen atmosphere. The resulting latex polymer, poly(2-methacrylamido-2-methylpropanesulfonate-styrene-butyl acrylate-acrylic acid), after cooling throughout possessed an weight average molecular weight $M_w$ of 51,500, and a number average molecular weight $M_n$ of 21,600, as determined on a Waters GPC, and a glass transition temperature of 39° C., as measured on a Seiko DSC. The latex polymer, or latex resin possessed a volume average diameter for the polymer of 171 nanometers as measured by light scattering technique on a Coulter N4 Plus Particle Sizer. The resin emulsion product was comprised of 40.1 percent by weight of poly(2-methacrylamido-2-methylpropanesulfonate-styrene-butyl acrylate-acrylic acid) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 58.8 percent by weight of water.

Example IA

An ink comprised of 3 percent by weight of CABOT IJX56 carbon black obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 3 percent by weight of the emulsion derived from Example I (the emulsion was comprised of 40.1 percent by weight of poly(2-methacrylamido-2-methylpropanesu lfonate-styrene-butyl acrylate-acrylic acid) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 58.8 percent by weight of water) was prepared by dissolution of the polyethyleneoxide in water through simple agitation using a stir bar for about 5 minutes, followed by the addition of sulfolane, 2-pyrrolidinone and resin emulsion. The resulting mixture was added to a stirring solution of CABOT IJX56 carbon black. The ink mixture resulting was stirred with a stir bar for about 5 to about 10 minutes, and the resulting ink mixture was filtered through a 1 μm glass fiber filter. The resulting ink was comprised of 3 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 3 percent by weight of poly(2-methacrylamido-2-methylpropanesulfonate-styrene-butyl acrylate-acrylic acid) resin emulsion, and 67.75 percent by weight of water.

Example II

An ionic sulfonate latex emulsion comprised of polymer particles derived from emulsion polymerization of ammonium 2-methacrylamido-2-methylpropanesulfonate, styrene, butyl acrylate, acrylic acid, 2/82/18/2 parts (by weight), was prepared as follows.

In a 1,000 milliliter jacketed glass flask equipped with a mechanical stirrer, 2.7 grams of ammonium persulfate, 19.2 grams of sodium dodecylbenzene sulfonate anionic surfactant, NEOGEN R™ (20 percent active), 5.8 grams of polyoxyethylene nonyl phenyl ether nonionic surfactant, ANTAROX CA897™ (70 percent active), and 391 grams of deionized water were deaerated for 30 minutes. A monomer mixture of 10.8 grams of AMPS 2411™ (ammonium 2-methacrylamido-2-methylpropane sulfonate, 50 percent active), 221 grams of styrene, 49 grams of butyl acrylate, 5.4 grams of acrylic acid, and 5.2 grams of dodecanethiol was charged into the flask and the resulting mixture was emulsified for 10 minutes at room temperature, about 25° C. throughout. The resulting emulsion was then polymerized at 80° C. for 6 hours in a nitrogen atmosphere. The resulting latex polymer, poly(2-methacrylamido-2-methylpropanesulfonate-styrene-butyl acrylate-acrylic acid), after cooling throughout possessed an weight average molecular weight $M_w$ of 82,700, and a number average molecular weight $M_n$ of 30,500, as determined on a Waters GPC, and a glass transition temperature of 66° C., as measured on a Seiko DSC. The latex polymer, or latex resin possessed a volume average diameter for the polymer of 191 nanometers as measured by light scattering technique on a Coulter N4 Plus Particle Sizer. The resin emulsion product was comprised of 41.0 percent by weight of poly(2-methacrylamido-2-methylpropanesulfonate-styrene-butyl acrylate-acrylic acid) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 57.9 percent by weight of water.

Example IIA

An ink comprised of 3 percent by weight of CABOT IJX56 carbon black obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 2 percent by weight of the emulsion derived from Example II (the emulsion comprised of 41.0 percent by weight of poly(2-methacrylamido-2-methylpropanesulfonate-styrene-butyl acrylate-acrylic acid) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 57.9 percent by weight of water) was prepared by dissolution of the polyethyleneoxide in water through simple agitation using a stir bar for about 5 minutes, followed by the addition of sulfolane, 2-pyrrolidinone and resin emulsion. This mixture was added to a stirring solution of CABOT IJX56 carbon black. The ink mixture was stirred with a stir bar for about 5 to about 10 minutes, and the resulting ink mixture was filtered through a 1 μm glass fiber filter. The resulting ink was comprised of 3 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 2 percent by weight of poly(2-methacrylamido-2-methylpropanesulfonate-styrene-butyl acrylate-acrylic acid) resin emulsion, and 68.75 percent by weight of water.

Example III

An emulsion comprised of polymer particles derived from emulsion polymerization of ammonium 2-methacrylamido-2-methylpropane sulfonate, styrene, butyl acrylate, 3/77/23 parts (by weight), was prepared as follows.

In a 1,000 milliliter jacketed glass flask equipped with a mechanical stirrer, 2.7 grams of ammonium persulfate, 19.2 grams of sodium dodecylbenzene sulfonate anionic surfactant, NEOGEN R™ (20 percent active), 5.8 grams of polyoxyethylene nonyl phenyl ether nonionic surfactant, ANTAROX CA897™ (70 percent active), and 391 grams of deionized water were deaerated for 30 minutes. A monomer mixture of 16.2 grams of AMPS 2411™ (ammonium 2-methacrylamido-2-methylpropane sulfonate, 50 percent active), 208 grams of styrene, 62 grams of butyl acrylate, and 7.4 grams of dodecanethiol was charged into the flask and the resulting mixture was emulsified for 10 minutes at room temperature, about 25° C. throughout. This emulsion was then polymerized at 80° C. for 6 hours in a nitrogen atmosphere. The resulting latex polymer, poly(2-methacrylamido-2-methylpropanesulfonate-styrene-butyl acrylate), after cooling throughout possessed an weight average molecular weight $M_w$ of 48,100, and a number average molecular weight $M_n$ of 20,200, as determined on a Waters GPC, and a glass transition temperature of 32° C., as measured on a Seiko DSC. The latex polymer, or latex resin possessed a volume average diameter for the polymer of 213 nanometers as measured by light scattering technique on a Coulter N4 Plus Particle Sizer. The resin emulsion product was comprised of 40.0 percent by weight of poly(2-methacrylamido-2-methylpropane sulfonate-styrene-butyl acrylate-acrylic acid) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 58.9 percent by weight of water.

Example IIIA

An ink comprised of 3 percent by weight of CABOT IJX56 carbon black obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 3 percent by weight of the emulsion derived from Example III (the emulsion comprised of 40.0 percent by weight of poly(2-methacrylamido-2-methylpropanesulfonate-styrene-butyl acrylate) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 58.9 percent by weight of water) was prepared by dissolution of the polyethyleneoxide in water through simple agitation using a stir bar for about 5 minutes, followed by the addition of sulfolane, 2-pyrrolidinone and resin emulsion. This mixture was added to a stirring solution of CABOT IJX56 carbon black. The ink mixture was stirred with a stir bar for about 5 to about 10 minutes, and the resulting ink mixture was filtered through a 1 μm glass fiber filter. The resulting ink was comprised of 3 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 3 percent by weight of poly(2-methacrylamido-2-methylpropanesulfonate-styrene-butyl acrylate) resin emulsion, and 67.75 percent by weight of water.

Example IV

An ionic sulfonate latex emulsion comprised of polymer particles derived from emulsion polymerization of sodium vinyl sulfonate, styrene, butyl acrylate, acrylic acid, 3/77/23/2 parts (by weight), was prepared as follows.

In a 1,000 milliliter jacketed glass flask equipped with a mechanical stirrer, 2.7 grams of ammonium persulfate, 19.2 grams of sodium dodecylbenzene sulfonate anionic surfactant, NEOGEN R™ (20 percent active), 5.8 grams of polyoxyethylene nonyl phenyl ether nonionic surfactant, ANTAROX CA897™ (70 percent active), and 391 grams of deionized water were deaerated for 30 minutes. A monomer mixture of 64.8 grams of sodium vinyl sulfonate (25 percent active, available from Air Product), 208 grams of styrene, 62 grams of butyl acrylate, and 5.4 grams of acrylic acid, and 7.4 grams of dodecanethiol was charged into the flask, and the resulting mixture was emulsified for 10 minutes at room temperature, about 25° C. throughout. This emulsion was then polymerized at 80° C. for 6 hours in a nitrogen atmosphere. The resulting latex polymer, poly(vinyl sulfonate-styrene-butyl acrylate-acrylic acid), after cooling throughout possessed an weight average molecular weight $M_w$ of 45,500, and a number average molecular weight $M_n$ of 19,600, as determined on a Waters GPC, and a glass transition temperature of 38° C., as measured on a Seiko DSC. The latex polymer, or latex resin possessed a volume average diameter for the polymer of 182 nanometers as measured by light scattering technique on a Coulter N4 Plus Particle Sizer. The resin emulsion product was comprised of 41.0 percent by weight of poly(vinyl sulfonate-styrene-butyl acrylate-acrylic acid) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 57.9 percent by weight of water.

Example IVA

An ink comprised of 3 percent by weight of CABOT IJX56 carbon black obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 3 percent by weight of the emulsion derived from Example IV (the emulsion comprised of 41.0 percent by weight of poly(vinyl sulfonate-styrene-butyl acrylate-acrylic acid) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 57.9 percent by weight of water) was prepared by dissolution of the polyethyleneoxide in water through simple agitation using a stir bar for about 5 minutes, followed by the addition of sulfolane, 2-pyrrolidinone and resin emulsion. This mixture was added to a stirring solution of CABOT IJX56 carbon black. The ink mixture was stirred with a stir bar for about 5 to about 10 minutes, and the resulting ink mixture was filtered through a 1 μm glass fiber filter. The resulting ink was comprised of 3 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 3 percent by weight of poly(vinyl sulfonate-styrene-butyl acrylate-acrylic acid) resin emulsion, and 67.75 percent by weight of water.

Comparative Example 1

A comparative latex emulsion was prepared without an ionic sulfonate monomer and wherein the latex emulsion was comprised of polymer particles derived from emulsion polymerization of styrene, butyl acrylate, acrylic acid, 77/23/2 parts (by weight), was prepared as follows.

In a 1,000 milliliter jacketed glass flask equipped with a mechanical stirrer, 2.7 grams of ammonium persulfate, 19.2 grams of sodium dodecylbenzene sulfonate anionic surfactant, NEOGEN R™ (20 percent active), 5.8 grams of polyoxyethylene nonyl phenyl ether nonionic surfactant, ANTAROX CA897™ (70 percent active), and 391 grams of deionized water were deaerated for 30 minutes. A monomer mixture of 208 grams of styrene, 62 grams of butyl acrylate, and 5.4 grams of acrylic acid, and 7.4 grams of dodecanethiol was charged into the flask and the resulting mixture was emulsified for 10 minutes at room temperature, about 25° C. throughout. This emulsion was then polymerized at 80° C. for 6 hours in a nitrogen atmosphere. The resulting latex polymer, poly(styrene-butyl acrylate-acrylic acid), after cooling throughout possessed an weight average molecular weight $M_w$ of 54,200, and a number average molecular weight $M_n$ of 22,500, as determined on a Waters GPC, and a glass transition temperature of 41° C., as measured on a Seiko DSC. The latex polymer, or latex resin possessed a volume average diameter for the polymer of 142 nanometers as measured by light scattering technique on a Coulter N4 Plus Particle Sizer. The resin emulsion product comprised of 40.0 percent by weight of poly(styrene-butyl acrylate-acrylic acid) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 58.9 percent by weight of water.

Comparative Example 1A

Comparative ink was prepared from a latex polymer containing no ionic sulfonate monomer. This ink was comprised of 3 percent by weight of CABOT IJX56 carbon black obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 3 percent by weight of the emulsion obtained from Comparative Example 1 (the emulsion was comprised of 40.0 percent by weight of poly(styrene-butyl acrylate-acrylic acid) resin, 0.55 percent by weight of sodium dodecylbenzene sulfonate NEOGEN R™, 0.55 percent by weight of polyoxyethylene nonyl phenyl ether nonionic surfactant ANTAROX CA897™, and 58.9 percent by weight of water) was prepared by dissolution of the polyethyleneoxide in water through simple agitation using a stir bar for about 5 minutes, followed by the addition of sulfolane, 2-pyrrolidinone and resin emulsion. This mixture was added to a stirring solution of CABOT IJX56 carbon black. The ink mixture was stirred with a stir bar for about 5 to about 10 minutes, and the resulting ink mixture was filtered through a 1 μm glass fiber filter. The resulting ink comprised of 3 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 3 percent by weight of poly(styrene-butyl acrylate-acrylic acid) resin emulsion, and 67.75 percent by weight of water.

Results:

TABLE

All Properties Measured at 25° C.

| Ink ID | Viscosity Cps | Surface tension dyne/cm | pH | Optical density LX | Heater deposits Rating <3 is excellent, >3 is poor |
|---|---|---|---|---|---|
| Example IA | 2.23 | 35.2 | 5.30 | 1.45 | 1 |
| After heat treatment 60° C./24 hr | 2.20 | 35.5 | 5.19 | 1.44 | 1 |
| Example IIA | 2.46 | 32.0 | 5.20 | 1.46 | 1 |
| After heat treatment 60° C./24 hr | 2.45 | 31.8 | 5.55 | 1.42 | 1 |
| Example IIIA | 2.35 | 33.0 | 5.02 | 1.53 | 1 |
| After heat treatment 60° C./24 hr | 2.32 | 32.8 | 5.00 | 1.52 | 1 |
| Example IVA | 2.21 | 32.8 | 5.38 | 1.43 | 2 |
| After heat treatment 60° C./24 hr | 2.24 | 33.0 | 5.30 | 1.42 | 2 |
| Comparative 1A | 2.50 | 32.1 | 5.49 | 1.43 | 7 |
| After heat treatment 60° C./24 hr | 3.19 | 32.5 | 5.16 | 1.40 | 8 |

Rating:
1 = about 0 to 0.5% coverage of deposits on the heaters.
2 = about 0.05 to 5% coverage of deposits on the heaters.
7 = about 90% coverage of deposits on the heaters.
8 = about 95% coverage of deposits and thicker layer of deposits on the heaters.

Inks that exhibit excellent stability at room temperature and also when subjected to a 60° C. heat treatment are desired. Large changes greater than about 0.3 centipoise units for viscosity indicated instability. Other physical properties, such as surface tension or pH, were monitored, and changes of 3 dynes/cm or a change in pH by more than about 0.5 would indicate instability. Also desired are inks that are shelf stable with no evidence of settling or precipitates for at least 8 months at about 25° C. (The substantially constant viscosity, pH, and surface tension, should be maintained despite stressing the ink by, permitting the ink to remain in a bottle at room temperature, for example about 25° C., then subjecting the ink to heating at about 60° C.

(degrees Centigrade) for 24 hours. Under these stress conditions, the viscosity of the ink should not substantially increase or decrease more than about 0.5 cPs (centipoise), the surface tension of the ink does not substantially increase or decrease more than about 1 dyne/cm). The ink physical properties were measured after 60° C. heat treatment.

From the above Table, the four Examples where the invention latex polymer with ionic sulfonate group was designed to function with the colorant, there was exhibited excellent thermal stability with no change in viscosity. The rating for 1 and 2 indicate that essentially no heater deposits were seen on the heaters after the kogation procedure was performed. The use of an ionic sulfonate resin combined with the appropriate colorant, carbon black dispersion provided excellent interaction in the ink mixture, hence no agglomeration to the heaters upon firing the heaters. In the Comparative Examples, the latex resin prepared without ionic sulfonate monomer agglomerated upon heating with the carbon black dispersion, hence causing excessive heater deposits and insulating the heaters. The grading of a 7 indicates heavy deposits, and when this occurs, the firing frequency decreases, and the efficiency of the voltage applied will be reduced significantly resulting in poor ink jetting and streaky prints from the printhead, with lower than desired optical density.

Other modifications of the present invention may occur to those skilled in the art subsequent to a review of the present application and these modifications, including equivalents thereof, are intended to be included within the scope of the present invention.

What is claimed is:

1. A process for the preparation of an ink which comprises mixing an ink vehicle, a colorant and a latex generated by the polymerization of a mixture of olefinic monomers, wherein at least one of said olefinic monomers is sodium vinyl sulfonate or potassium vinyl sulfonate and which polymerization is accomplished in the presence of an anionic surfactant, and a nonionic surfactant.

* * * * *